United States Patent [19]

Chikamori et al.

[11] Patent Number: 5,129,366
[45] Date of Patent: Jul. 14, 1992

[54] DEAERATION SYSTEM FOR A BOILER

[75] Inventors: Yoshihiro Chikamori; Yoshihiko Shibata; Takushi Yokota; Youichi Shimizu, all of Okayama, Japan

[73] Assignee: Japan Gore-Tex, Inc., Tokyo, Japan

[21] Appl. No.: 676,656

[22] Filed: Mar. 28, 1991

[30] Foreign Application Priority Data

Apr. 2, 1990 [JP] Japan .................. 2-88043

[51] Int. Cl.⁵ ............................................. F22D 5/26
[52] U.S. Cl. ............................ 122/451 R; 55/39
[58] Field of Search ............. 122/451 R, 451 S; 55/39

[56] References Cited

U.S. PATENT DOCUMENTS 2,566,732  9/1951  Krieg .................................. 55/39 X
3,338,033  8/1967  Ross .................................. 55/39 X

FOREIGN PATENT DOCUMENTS 2810583  11/1978  Fed. Rep. of Germany .
1294090  10/1972  United Kingdom ............... 55/39

OTHER PUBLICATIONS

"Why Deaerate?", 1082 Heating, Piping and Air Conditioning, vol. 54 (1982) Nov., No. 11, Stamford, Conn., USA.

Primary Examiner—Edward G. Favors
Attorney, Agent, or Firm—Gary A. Samuels

[57] ABSTRACT

A boiler system having a condensate line and a deaeration or and a condensate tank characterized by the fact that the deaerator is placed between the condensation tank and the boiler.

2 Claims, 1 Drawing Sheet

DEAERATION SYSTEM FOR A BOILER

FIELD OF THE INVENTION

The present invention concerns a system for deaerating water supplied to a boiler.

BACKGROUND OF THE INVENTION

In the past, the following two boiler systems have been known: (1) systems where steam is recovered (systems that are fitted with condensate lines), and (2) systems where steam is not recovered (systems that are not fitted with condensate lines). In the case of the former (see FIG. 3), a tank is placed before the boiler, with a deaerator being positioned before said tank. Furthermore, there are such deaeration methods as the chemical injection method, the vacuum method (it can also be performed at elevated temperatures and under increased pressures), the film-type method, etc.

However, in conventional boiler systems, and especially in boiler systems having condensate lines, it has been difficult to supply a boiler with deaerated water having a specified concentration of dissolved oxygen that does not change in the process. The chemical injection method does not insure a complete deaeration (removal of dissolved oxygen), causing the boiler to corrode, while the vacuum method requires large-size equipment or operates under the conditions of elevated temperatures and high pressures even for compact boilers (and is often used with large-size boilers). Film-type deaerators are compartively small when used in boiler systems which do not have condensate lines and can easily supply deaerated water to the boiler, but when a boiler system is fitted with a condensate line for steam recovery, it becomes impossible to render the tank's (the condensate tank's) structure airtight, thereby permitting oxygen which penetrates through the openings to be dissolved again and causing the boiler to corrode.

SUMMARY OF THE INVENTION

As a result of research aimed at overcoming the above-mentioned disadvantages, the following system has been proposed by the inventors:

(1) A boiler system having a condensate line, wherein said system comprises a condensate tank and a boiler, characterized by the fact that a deaerator is placed between the tank and the boiler;

(2) A boiler system having a condensate line, wherein said system is characterized by the fact that a first conveying pump, a deaerator, and a second conveying pump are placed in the stated sequence between a condensate tank and the boiler, and a bypass for returning water into the tank is installed between the deaerator and the second conveying pump (b);

(3) The deaeration system for a boiler according to claim 1 or 2, characterized by the fact that the deaerator is a film-type deaerator.

By placing the deaerator further from the condensate tank and closer to the boiler, it becomes possible to prevent re-dissolution of oxygen gas inside the condensate tank and thus to maintain the specified deaeration level, achieved at the deaerator, until water reaches the boiler inlet port.

Compared to the water temperature achieved when the deaerator is placed before the condensate tank (5° to 25° C.), the temperature of water is higher (30° to 95° C.) when the deaerator is further from the condensate tank and closer to the boiler, leading to an increased deaeration efficiency (this is because the higher the water temperature, the lower the saturation concentration of dissolved oxygen and the greater the diffusion efficiency of dissolved oxygen, resulting in an increased deaeration efficiency) and thereby making it possible to achieve a specified deaeration level using a more compact deaerator than in cases where deaerators are installed before condensate tanks.

Moreover, when the film-type method is used in the deaeration system which is fitted with a bypass for returning water into the condensate tank, it becomes possible to use film-type deaerator modules with low pressure-tightness by adopting low-pressure conveying pumps and adjusting the pressure.

DESCRIPTION OF THE INVENTION

The following is a detailed description of some specific examples of the present invention with reference to the accompanying figures.

Figure 1:
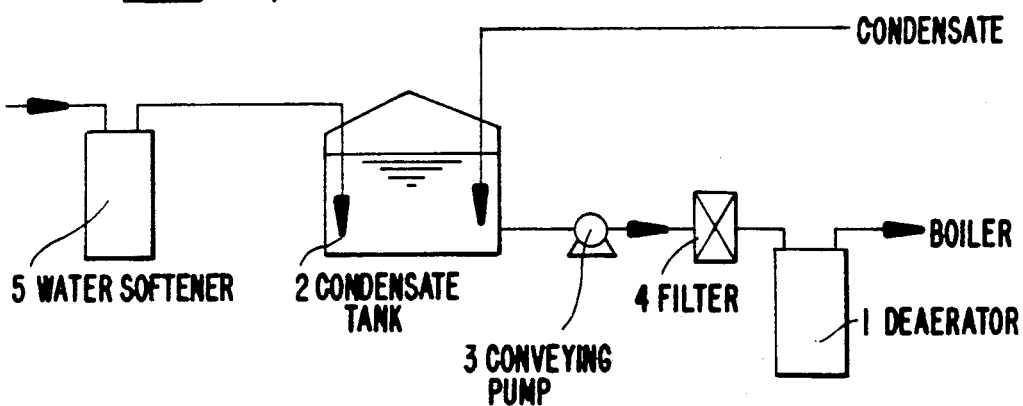
FIG. 1 is a diagram showing an example of the deaeration system of the present invention.

FIG. 1 refers to an example of the deaeration system according to claim 1 of the present invention and shows a boiler system which is fitted with the following devices; (1) a condensate tank 2, (2) a conveying pump 3, (3) a deaerator 1, and (4) a boiler arranged so as to ensure that water is conveyed in the stated sequence between the condensate tank 2 and the boiler. Condensate water is recovered from the boiler and is returned to the condensate tank via a separate passage in a manner identical to that described for the conventional example shown in FIG. 3.

Figure 2:
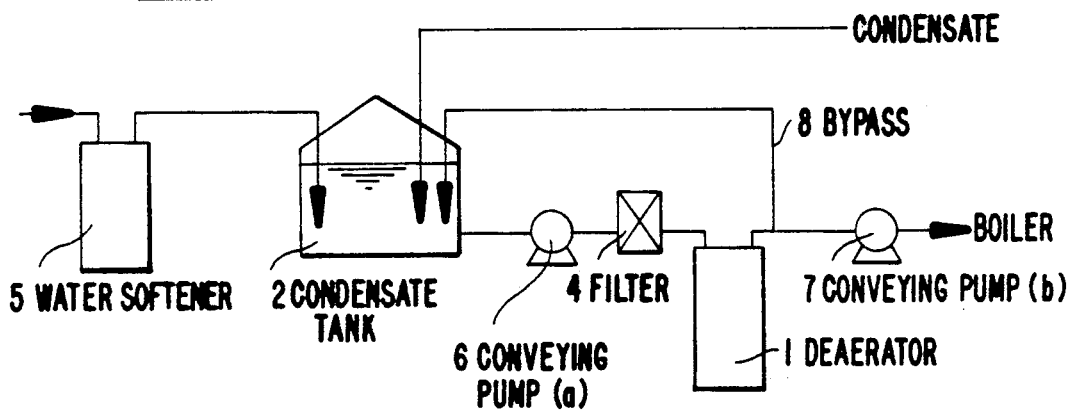
FIG. 2 is a diagram showing another example of the deaeration system of the present invention.

FIG. 2 refers to an example of the deaeration system according to claim 2 of the present invention and shows a case where, in addition to conveying water in a sequential manner through the following devices; (1) a condensate tank 2, (2) a first conveying pump (a), (3) a deaerator 1, (4) a second conveying pump (b), and (5) a boiler, a bypass 8 for returning water into the condensate tank 2 in additionally provided between the deaerator 1 and the conveying pump (b). In this case, a conveying pressure difference is set up between the first conveying pump (a) and a second conveying pump (b), and the amount of water being supplied is controlled by using the bypass 8, thereby avoiding the application of excess loads to film-type modules and achieving a long-term stability of the system even when a film-type deaerator which contains a film-type modules is used as the deaerator 1 (because elevated temperatures (30° to 95° C.) and high pressures of no less than about 7 $kg/cm^2$ are required to supply water from the condensate tank to the boiler, it is difficult to construct a film-type module capable of withstanding such conditions for a long period of time).

The following is a more detailed explanation of the case when the film-type method is adopted and the amount of water being supplied is controlled by two conveying pumps. First of all, in order not to subject the film-type module to an excessive load, a low pressure conveying pump (a) is used for pumping water from the condensate tank 2 into the deaerator. Then, a high-pressure conveying pump (b) is used to pump water from the deaerator 1 into the boiler by creating a hydraulic pressure required to supply water into the boiler. The amount of water being supplied is controlled in an appropriate manner by using the above-mentioned bypass 8 connected to the condensate tank 2.

The following is an explanation of a specific experimental example of the boiler deaeration system pertaining to the present invention.

Experiments were conducted by using a boiler that required the supply of water in an amount of 1 Ton/hr.

COMPARATIVE EXAMPLE

Figure 3:
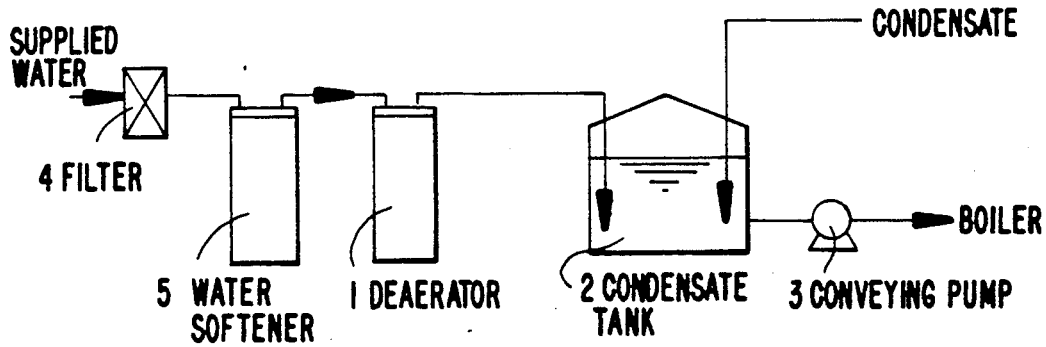
FIG. 3 is a diagram showing a conventional deaeration system.

A film-type deaerator (a film-type deaerator module having a length of 320 mm and a diameter of 1000 mm and manufactured by JAPAN GORE-TEX, INC.) was adopted in the conventional boiler system shown in FIG. 3, and a dissovled oxygen concentration of no more than 0.05 ppm was specified in order not to cause the corrosion of the boiler. And although this object was attained for the inlet port of the condensate tank 2, it was impossible to maintain the concentration of dissolved oxygen at the boiler inlet port at a value of no more than 0.5 ppm. This was due to the fact that the return of condensate resulted in the redissolution of oxygen.

EXPERIMENTAL EXAMPLE 1

When a film-type deaerator identical to that used in Comparative Example was used in the boiler system shown in FIG. 1, a dissolved oxygen concentration of no more than 0.5 ppm was obtained even at the boiler inlet port. This was due to the fact that the deaeration efficiency was made higher because, first, the deaeration was conducted immediately before water was fed into the boiler and, second, deaeration was performed on water which had a temperature of 60° to 80° C. when it was leaving the condensate tank in Experimental Example 1, in contrast to performing deaeration on water which had a temperature of 10° to 20° C. before entering the condensate tank 2 in Comparative Example.

EXPERIMENTAL EXAMPLE 2

In the case of the boiler system shown in FIG. 2, it was possible to use a film-type deaerator that had even lower pressure specifications than in Comparative Example and Experimental Example 1, thereby ensuring that a dissovled oxygen concentration of no more than 0.5 ppm was achieved. Moreover, since tank water could be circulated through the bypass 8, it was also possible to supply water having a specified concentration of dissolved oxygen immediately after the boiler operation.

We claim:

1. A boiler system having a condensate line, a deaerator and a condensate tank characterized by the fact that a first conveying pump, the deaerator, and a second conveying pump are placed between the condensation tank and the boiler, and a bypass for returning water into the condensation tank is installed between the deaerator and the second conveying pump.

2. A boiler system according to claim 1 characterized by the fact that the deaerator is a film-type deaerator.

* * * * *